(12) United States Patent
Grandberry et al.

(10) Patent No.: US 7,770,301 B1
(45) Date of Patent: Aug. 10, 2010

(54) PORTABLE MEASURING SYSTEMS

(76) Inventors: Lee A. Grandberry, 2105 W. Dobbins Rd., Phoenix, AZ (US) 85041; Sandi R. Grandberry, 2105 W. Dobbins Rd., Phoenix, AZ (US) 85041

(*) Notice: Subject to any disclaimer, the term of this patent is extended or adjusted under 35 U.S.C. 154(b) by 132 days.

(21) Appl. No.: 12/124,976

(22) Filed: May 21, 2008

Related U.S. Application Data (60) Provisional application No. 60/953,167, filed on Jul. 31, 2007, provisional application No. 60/941,627, filed on Jun. 1, 2007.

(51) Int. Cl.
*A61B 5/107* (2006.01)
*B43L 7/00* (2006.01)

(52) U.S. Cl. .............. 33/494; 33/832; 33/512

(58) Field of Classification Search ............ 33/494, 33/832, 512
See application file for complete search history.

(56) References Cited

U.S. PATENT DOCUMENTS

| | | | |
|---|---|---|---|
| 941,492 A | 11/1909 | Burns | |
| 1,608,771 A * | 11/1926 | Hunsdon | 33/512 |
| 1,974,085 A | 9/1934 | Shields et al. | |
| 1,996,553 A | 4/1935 | Scully | |
| 2,313,920 A * | 3/1943 | Campbell | 33/484 |
| 2,369,988 A * | 2/1945 | Steckler | 434/187 |
| 2,410,696 A * | 11/1946 | Wheeler | 33/484 |
| 3,313,030 A * | 4/1967 | Heys | 33/512 |
| 3,934,351 A | 1/1976 | Sullivan | |
| 4,008,524 A * | 2/1977 | Allen | 33/512 |
| 4,118,868 A | 10/1978 | Johnson | |
| 4,134,212 A * | 1/1979 | Allen | 33/512 |
| 4,495,702 A | 1/1985 | Bergstedt | |
| 6,003,235 A | 12/1999 | Chen | |
| 6,237,239 B1 * | 5/2001 | Miyazaki | 33/512 |
| 6,519,868 B1 | 2/2003 | Pryor et al. | |
| 6,964,110 B2 | 11/2005 | Shapiro | |
| 7,059,060 B1 | 6/2006 | Baumgartner | |
| 7,103,983 B2 | 9/2006 | Lehavi | |
| 7,155,838 B2 * | 1/2007 | Leyden et al. | 33/492 |
| 7,171,757 B1 | 2/2007 | Stoneberg | |
| 7,181,861 B1 * | 2/2007 | Leser | 33/832 |
| 7,475,487 B1 * | 1/2009 | Johnson | 33/512 |

* cited by examiner

*Primary Examiner*—Christopher W Fulton
(74) *Attorney, Agent, or Firm*—Stoneman Volk Patent Group; Martin L. Stoneman; Michael D. Volk, Jr.

(57) ABSTRACT

A portable system for documenting the height of one or more children during their growth. The system comprises an elongated frame that can be disassembled into segments for travel.

25 Claims, 5 Drawing Sheets

PORTABLE MEASURING SYSTEMS

CROSS-REFERENCE TO RELATED APPLICATIONS

The present application is related to and claims priority from prior provisional application Ser. No. 60/941,627, filed Jun. 1, 2007, entitled "PORTABLE MEASURING SYSTEMS", and is related to and claims priority from prior provisional application Ser. No. 60/953,167, filed Jul. 31, 2007, entitled "PORTABLE MEASURING SYSTEMS" the contents of which are incorporated herein by this reference and are not admitted to be prior art with respect to the present invention by the mention in this cross-reference section.

BACKGROUND

This invention relates to providing portable measuring systems. More particularly this invention relates to providing a system for documenting the height of one or more children during their growth and development.

It is common for a parent or grandparent to document the growth of a child for medical and health reasons as well as for general curiosity. Typically, marks corresponding to the height of the child are made on wall or door frame. Unfortunately, these marks are often lost when the family moves from a home or repaints the marked substrate. Furthermore, a family member who does not live close to the child may wish to have a means for documenting the child's height that may be retained between visits. A transportable device for documenting a child's growth would be of beneficial use to many.

OBJECTS AND FEATURES OF THE INVENTION

A primary object and feature of the present invention is to provide a system overcoming the above-mentioned problems.

It is a further object and feature of the present invention to provide such a system that documents the growth in height of one or more children.

It is another object and feature of the present invention to provide such a system that is easily transported during travel (e.g., by visiting grandparents).

It is a further object and feature of the present invention to provide such a system that is easily detachable/mountable to a vertical surface such as a wall.

A further primary object and feature of the present invention is to provide such a system that is efficient, inexpensive, and handy. Other objects and features of this invention will become apparent with reference to the following descriptions.

SUMMARY OF THE INVENTION

A portable measuring system, relating to measuring growth-activity of at least one child over successive intervals of time, such system comprising at least one measurement scale structured and arranged to assist accurate measurement of growth-activity of at least one child; wherein such at least one measurement scale comprises at least one first measuring segment structured and arranged to provide at least one first segment portion of such at least one measurement scale, at least one second measuring segment structured and arranged to provide at least one second segment portion of such at least one measurement scale, at least one third measuring segment structured and arranged to provide at least one third segment portion of such at least one measurement scale, at least one first interlocker structured and arranged to detachably interlock such at least one first measuring segment with such at least one second measuring segment, and at least one second interlocker structured and arranged to detachably interlock such at least one third measuring segment with such at least one second measuring segment; wherein such at least one first interlocker comprises at least one first "jigsaw-puzzle-piece" shape structured and arranged to provide detachable "jigsaw-puzzle-piece" interlocking of such at least one first measuring segment with such at least one second measuring segment; wherein such at least one second interlocker comprises at least one second "jigsaw-puzzle-piece" shape structured and arranged to provide detachable "jigsaw-puzzle-piece" interlocking of such at least one third measuring segment with such at least one second measuring segment; wherein such at least one first "jigsaw-puzzle-piece" shape differs from such at least one second "jigsaw-puzzle-piece" shape; and wherein detachable "jigsaw-puzzle-piece" interlocking of such at least one first measuring segment with such at least one second measuring segment and detachable "jigsaw-puzzle-piece" interlocking of such at least one third measuring segment with such at least one second measuring segment enables the use of such at least one measurement scale to assist accurate measurement of growth-activity of at least one child; wherein such at least one first interlocker is further characterized in that such at least one first interlocker comprises at least one first male projection structured and arranged to provide at least one first geometrically-shaped male projection extending generally outwardly from such at least one first measuring segment, and fashioned within such at least one second measuring segment, at least one first female receiver structured and arranged to receive such at least one first male projection; wherein such at least one second interlocker is further characterized in that such at least one second interlocker further comprises at least one second male projection structured and arranged to provide at least one second geometrically-shaped male projection extending outwardly from such at least one second measuring segment, and fashioned within such at least one third measuring segment, at least one second female receiver structured and arranged to receive such at least one second male projection; wherein such at least one first female receiver comprises at least one first geometrical shape substantially complementary to the at least one first geometrically-shaped male projection of such at least one first male projection; wherein such at least one second female receiver comprises at least one second geometrical shape substantially complementary to the at least one second geometrically-shaped male projection of such at least one second male projection; and wherein such at least one first geometrical shape differs from such at least one second geometrical shape. Moreover, it provides such a portable measuring system further comprising at least one mount structured and arranged to mount such at least one measurement scale to at least one wall. Additionally, it provides such a portable measuring system wherein such at least one mount comprises at least one compensating spacer structured and arranged to compensatively space such at least one measurement scale at least one distance away from the at least one wall at least equal to the thickness of at least one baseboard of the at least one wall; wherein such at least one compensating spacer allows substantially vertical mounting of such at least one measurement scale adjacent the at least one wall comprising the at least one baseboard. Also, it provides such a portable measuring system further comprising at least one storage sleeve structured and arranged to storably sleeve such at least one measurement scale during transport. In addition, it provides such a portable measuring system further comprising: at least one slot structured and arranged to hold at least one substantially planar object; wherein such at least one slot extends along at least one length of such at least one measurement scale. And, it provides such a portable measuring system wherein such at least one slot comprises at least one dovetail shape. Further, it provides such a portable measuring system wherein such at least one first measuring segment, such at least one second measuring segment, and such at least one third measuring segment each comprise a width of between about 1½ inches and about 6 inches; and such at least one first measuring segment, such at least one second measuring segment, and such at least one third measuring segment each comprise a thickness of between about ½ inch and about 1½ inch. Even further, it provides such a portable measuring system wherein such at least one first interlocker and such at least one second interlocker comprise a geometrical shape at least partially unique from any other one of such at least one first interlocker and such at least one second interlocker. Moreover, it provides such a portable measuring system wherein each measuring segment comprises measurement indicia. Additionally, it provides such a portable measuring system wherein such at least one measurement scale further comprises at least one slot structured and arranged to hold at least one substantially planar object. Also, it provides such a portable measuring system wherein a photograph may be attached to at least one of such at least one first measuring segment, such at least one second measuring segment, and such at least one third measuring segment.

In accordance with another preferred embodiment hereof, this invention provides a portable measuring system kit, relating to measuring growth-activity of at least one minor over successive intervals of time, comprising at least one measurement scale structured and arranged to assist accurate measurement of growth-activity of at least one minor, wherein such at least one measurement scale comprises at least one first measuring segment structured and arranged to provide at least one first segment portion of such at least one measurement scale, at least one second measuring segment structured and arranged to provide at least one second segment portion of such at least one measurement scale, at least one third measuring segment structured and arranged to provide at least one third segment portion of such at least one measurement scale, at least one first interlocker structured and arranged to detachably interlock such at least one first measuring segment with such at least one second measuring segment, and at least one second interlocker structured and arranged to detachably interlock such at least one third measuring segment with such at least one second measuring segment, wherein such at least one first interlocker comprises at least one first "jigsaw-puzzle-piece" shape structured and arranged to provide detachable "jigsaw-puzzle-piece" interlocking of such at least one first measuring segment with such at least one second measuring segment, wherein such at least one second interlocker comprises at least one second "jigsaw-puzzle-piece" shape structured and arranged to provide detachable "jigsaw-puzzle-piece" interlocking of such at least one third measuring segment with such at least one second measuring segment, wherein such at least one first "jigsaw-puzzle-piece" shape differs from such at least one second "jigsaw-puzzle-piece" shape, and wherein detachable "jigsaw-puzzle-piece" interlocking of such at least one first measuring segment with such at least one second measuring segment and detachable "jigsaw-puzzle-piece" interlocking of such at least one third measuring segment with such at least one second measuring segment enables the use of such at least one measurement scale to assist accurate measurement of growth-activity of at least one minor, wherein such at least one first interlocker is further characterized in that such at least one first interlocker comprises at least one first male projection structured and arranged to provide at least one first geometrically-shaped male projection extending generally outwardly from such at least one first measuring segment, and fashioned within such at least one second measuring segment, at least one first female receiver structured and arranged to receive such at least one first male projection, wherein such at least one second interlocker is further characterized in that such at least one second interlocker comprises at least one second male projection structured and arranged to provide at least one second geometrically-shaped male projection extending outwardly from such at least one second measuring segment, and fashioned within such at least one third measuring segment, at least one second female receiver structured and arranged to receive such at least one second male projection, wherein such at least one first female receiver comprises at least one first geometrical shape substantially complementary to the at least one first geometrically-shaped male projection of such at least one first male projection, wherein such at least one second female receiver comprises at least one second geometrical shape substantially complementary to the at least one second geometrically-shaped male projection of such at least one second male projection, and wherein such at least one first geometrical shape differs from such at least one second geometrical shape; and at least one storage bag structured and arranged to carry the measuring segments when the measuring segments are not interlocked. In addition, it provides such a portable measuring system kit further comprising at least one set of user instructions to provide instruction for use. And, it provides such a portable measuring system kit further comprising at least one marking pen to assist at least one user in applying visual markings to at least one of the measuring segments. Further, it provides such a portable measuring system kit further comprising at least one compensating spacer structured and arranged to compensatively space such at least one measurement scale at least one distance away from at least one wall at least equal to the thickness of at least one baseboard of at least one wall. Even further, it provides such a portable measuring system kit comprising at least two compensating spacers sized differently to accommodate different thickness of baseboards. Even further, it provides such a portable measuring system wherein each measuring segment comprises measurement indicia.

In accordance with another preferred embodiment hereof, this invention provides a portable measuring system, relating to measuring growth-activity of a subject over successive intervals of time, such system comprising a measurement scale structured and arranged to assist accurate measurement of the growth-activity of a subject; wherein such measurement scale comprises a first measuring segment structured and arranged to provide a first segment portion of such measurement scale, a second measuring segment structured and arranged to provide a second segment portion of such measurement scale, a third measuring segment structured and arranged to provide a third segment portion of such measurement scale, a first interlocker structured and arranged to detachably interlock such first measuring segment with such second measuring segment, and a second interlocker structured and arranged to detachably interlock such third measuring segment with such second measuring segment, wherein such first interlocker comprises a first "jigsaw-puzzle-piece" shape structured and arranged to provide detachable "jigsaw-puzzle-piece" interlocking of such first measuring segment with such second measuring segment, wherein such second interlocker comprises a second "jigsaw-puzzle-piece" shape structured and arranged to provide detachable "jigsaw-puzzle-piece" interlocking of such third measuring segment with such second measuring segment, wherein such first "jigsaw-puzzle-piece" shape differs from such second "jigsaw-puzzle-piece" shape, wherein such first interlocker is further characterized in that such first interlocker comprises a first male projection structured and arranged to provide a first geometrically-shaped male projection extending generally outwardly from such first measuring segment, and fashioned within such second measuring segment, a first female receiver structured and arranged to receive such first male projection, wherein such second interlocker is further characterized in that such second interlocker comprises a second male projection structured and arranged to provide a second geometrically-shaped male projection extending outwardly from such at least one second measuring segment, and fashioned within such at least one third measuring segment, at least one second female receiver structured and arranged to receive such at least one second male projection, wherein such first female receiver comprises a first geometrical shape substantially complementary to the first geometrically-shaped male projection of such at least one first male projection, wherein such second female receiver comprises a second geometrical shape substantially complementary to the second geometrically-shaped male projection of such second male projection, and wherein such first geometrical shape differs from such second geometrical shape. Even further, it provides such a portable measuring system wherein each measuring segment comprises measurement indicia. Even further, it provides such a portable measuring system wherein at least one of such first measuring segment, second measuring segment, and third measuring segment comprises non-measurement indicia. Even further, it provides such a portable measuring system wherein a photograph may be attached to such measurement scale. Even further, it provides such a portable measuring system wherein a photograph may be attached to at least one of such first measuring segment, such second measuring segment, and such third measuring segment. Even further, it provides such a portable measuring system wherein such measurement scale further comprises at least one slot structured and arranged to hold a photograph. Even further, it provides such a portable measuring system wherein at least one such first measuring segment, such second measuring segment, and such third measuring segment comprises at least one slot structured and arranged to hold a substantially planar object. Even further, it provides such a portable measuring system further comprising a wall attachment assembly structured and arranged to mount said measurement scale to a wall.

In accordance with a preferred embodiment hereof, this invention provides a portable measuring system, relating to measuring the growth-activity of at least one child over successive intervals of time, such system comprising: at least one measurement scale structured and arranged to assist accurate measurement of the growth-activity of the at least one child; wherein such at least one measurement scale comprises at least one first measuring segment structured and arranged to provide at least one first segment portion of such at least one measurement scale, and at least one second measuring segment structured and arranged to provide at least one second segment portion of such at least one measurement scale, at least one third measuring segment structured and arranged to provide at least one third segment portion of such at least one measurement scale, at least one first interlocker structured and arranged to detachably interlock such at least one first measuring segment with such at least one second measuring segment, and; at least one second interlocker structured and arranged to detachably interlock such at least one third measuring segment with such at least one second measuring segment; wherein such at least one first interlocker comprises at least one first "jigsaw-puzzle-piece" shape structured and arranged to provide detachable "jigsaw-puzzle-piece" interlocking of such at least one first measuring segment with such at least one second measuring segment; wherein such at least one second interlocker comprises at least one second "jigsaw-puzzle-piece" shape structured and arranged to provide detachable "jigsaw-puzzle-piece" interlocking of such at least one third measuring segment with such at least one second measuring segment; wherein such at least one first "jigsaw-puzzle-piece" shape differs from such at least one second "jigsaw-puzzle-piece" shape; and wherein detachable "jigsaw-puzzle-piece" interlocking of such at least one first measuring segment with such at least one second measuring segment and detachable "jigsaw-puzzle-piece" interlocking of such at least one third measuring segment with such at least one second measuring segment enables the use of such at least one measurement scale to assist accurate measurement of the growth-activity of the at least one child.

Moreover, it provides such a portable measuring system wherein: such at least one first interlocker comprises at least one first male projection structured and arranged to provide at least one first geometrically-shaped male projection extending generally outwardly from such at least one first measuring segment, and fashioned within such at least one second measuring segment, at least one first female receiver structured and arranged to receive such at least one first male projection; aid at least one second interlocker comprises at least one second male projection structured and arranged to provide at least one second geometrically-shaped male projection extending outwardly from such at least one second measuring segment, and fashioned within such at least one third measuring segment, at least one second female receive structured and arranged to receive such at least one second male projection; such at least one first female receiver comprises at least one first geometrical shape substantially complementary to such at least one first geometrically-shaped male projection of such at least one first male projection; such at least one second female receiver comprises at least one second geometrical shape substantially complementary to such at least one second geometrically-shaped male projection of such at least one second male projection; and such at least one first geometrical shape differs from such at least one second geometrical shape.

Additionally, it provides such a portable measuring system further comprising at least one mount structured and arranged to mount such at least one measurement scale to at least one wall. Also, it provides such a portable measuring system wherein: such at least one mount comprises at least one compensating spacer structured and arranged to compensatively space such at least one measurement scale at least one distance away from the at least one wall at least equal to the thickness of at least one baseboard of the at least one wall; wherein such at least one compensating spacer permits substantially vertical mounting of such at least one measurement scale adjacent the at least one wall comprising the at least one baseboard. In addition, it provides such a portable measuring system further comprising at least one storage sleeve structured and arranged to storably sleeve such at least one measurement scale during transport. And, it provides such a portable measuring system further comprising: at least one slot structured and arranged to hold at least one substantially planar object; wherein such at least one slot extends along at least one length of such at least one measurement scale.

Further, it provides such a portable measuring system wherein such at least one slot comprises at least one dovetail shape. Even further, it provides such a portable measuring system wherein such at least one first measuring segment, such at least one second measuring segment, and such at least one third measuring segment each comprise a width of between about 1½ inches and about 6 inches and a thickness of between about ½ inch and about 1½ inch. Moreover, it provides such a portable measuring system wherein such at least one first interlocker and such at least one second interlocker comprise a geometrical shape at least partially unique from any other one of such at least one first interlocker and such at least one second interlocker.

In accordance with another preferred embodiment hereof, this invention provides a portable measuring system kit, relating to measuring the growth-activity of at least one minor over successive intervals of time, comprising: at least two rigidly interlocking connectable measuring device segments; wherein when such at least two rigidly interlocking connectable measuring device segments are connected, a sufficiently rigid measuring means for measuring the at least one minor may be used to accurately measure the growth-activity of at least one minor; and at least one storage bag structured and arranged to carry such at least two rigidly interlocking connectable measuring device segments when such at least two rigidly interlocking connectable measuring device segments are not in a connected configuration. Additionally, it provides such a portable measuring system kit further comprising at least one set of user instructions to provide to the user instruction for use.

Also, it provides such a portable measuring system kit further comprising at least one marking pen to assist a user in applying visual markings to such at least two rigidly interlocking connectable measuring device segments. In addition, it provides such a portable measuring system kit further comprising at least one compensating spacer structured and arranged to compensatively space such at least one measurement scale at least one distance away from the at least one wall at least equal to the thickness of at least one baseboard of the at least one wall.

In accordance with another preferred embodiment hereof, this invention provides a method relating to construction of a portable measuring system to measure the growth-activity of at least one child over successive intervals of time, such method comprising the steps of: providing at least one bar of stick material; sanding such at least one bar of stick material to provide at least one base surface suitable for the application of at least one finish; applying to such at least one base surface at least one base coat of such at least one finish; cutting such at least one bar of stick material to provide at least one puzzle-like cut to produce at least one interlocking connector; sanding such at least one bar of stick material using at least one sanding material; applying measurement indicia to such at least one bar of stick material; applying at least one final protective finish to such at least one bar of stick material. And, it provides such a method further comprising the intermediate step of applying at least one antique finish prior to the step of applying at least one measurement indicia. Further, it provides such a method further comprising the intermediate step of applying at least one customer-selected non-measurement indicia prior to the applying such at least one final protective finish.

In accordance with another preferred embodiment hereof, this invention provides a portable measuring system, relating to measuring the growth-activity of at least one child over successive intervals of time, such system comprising: measurement scale means for assisting accurate measurement of the growth-activity of the at least one child; wherein such measurement scale means comprises first measuring segment means for providing at least one first segment portion of such measurement scale means, and second measuring segment means for providing at least one second segment portion of such measurement scale means, and at least one first "jigsaw-puzzle-piece" connector means for detachably connecting such first measuring segment means with such second measuring segment means; wherein detachably connecting such first measuring segment means with such second measuring segment means enables the use of such measurement scale means for assisting accurate measurement of the growth-activity of the at least one child.

Even further, it provides such a portable measuring system wherein: such measurement scale means further comprises third measuring segment means for providing at least one third segment portion of such measurement scale means, and at least one second "jigsaw-puzzle-piece" connector means for detachably connecting such third measuring segment means with such second measuring segment means; and wherein detachably connecting such third measuring segment means with such second measuring segment means and detachably connecting such first measuring segment means with such second measuring segment means enables the use of such measurement scale means for assisting accurate measurement of the growth-activity of the at least one child. Even further, it provides such a portable measuring system further comprising mounting means for mounting such measurement scale means to at least one wall. Even further, it provides such a portable measuring system wherein: such mounting means comprises compensating spacer means for compensatively spacing such measurement scale means at least one distance away from the at least one wall at least equal to the thickness of at least one baseboard of the at least one wall; wherein such compensating spacer means permits substantially vertical mounting of such measurement scale means adjacent the at least one wall comprising the at least one baseboard. Even further, it provides such a portable measuring system further comprising storage sleeve means for storably sleeving such measurement scale means during transport. In addition, it provides each and every novel feature, element, combination, step and/or method disclosed or suggested by this patent application.

DETAILED DESCRIPTION OF THE BEST MODES AND PREFERRED EMBODIMENTS OF THE INVENTION

Figures 1, 2:
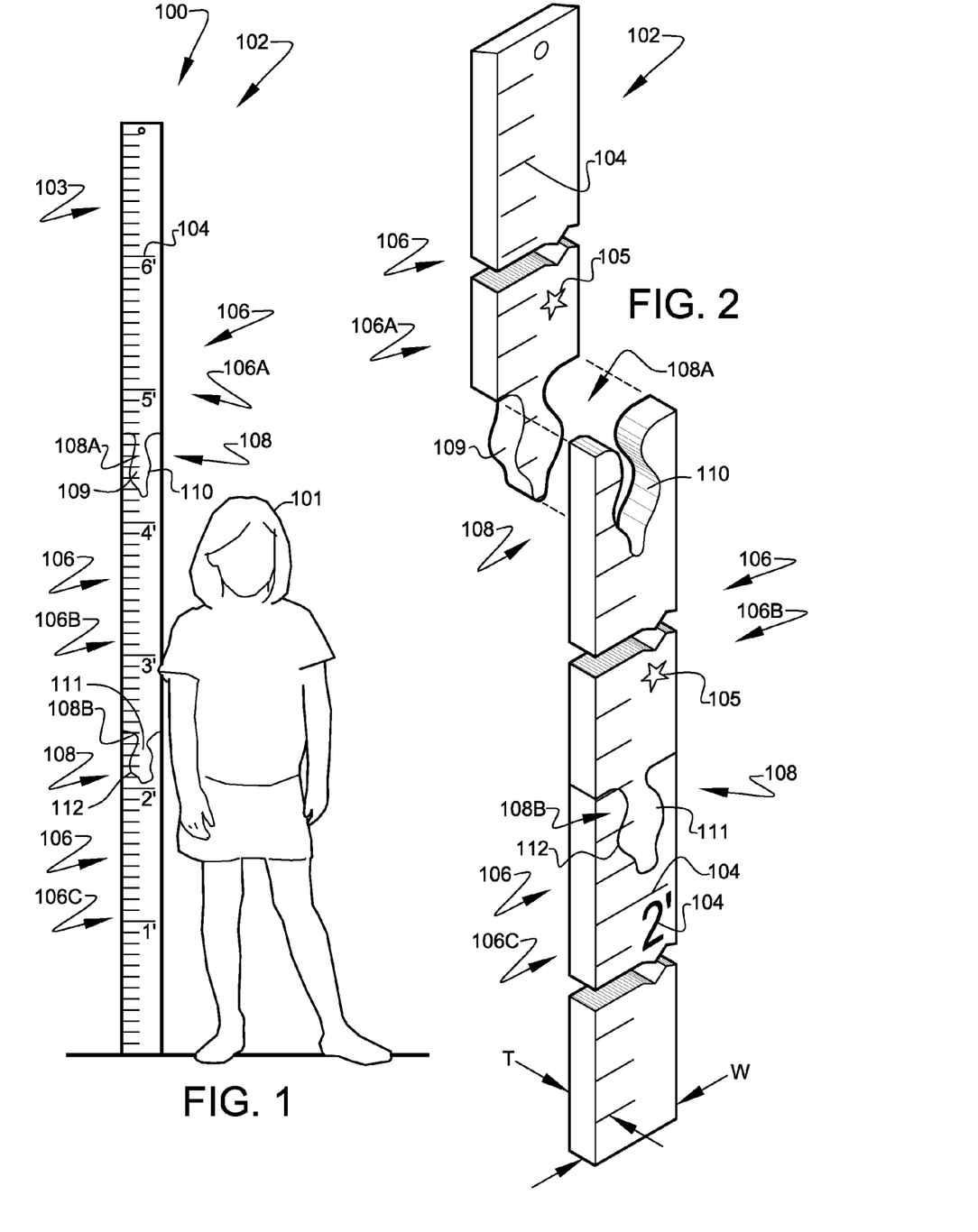
FIG. 1 shows a perspective view, illustrating a portable measuring stick, used to record the height of an individual, according to a preferred embodiment of the present invention.
FIG. 2 shows a perspective view illustrating the principal components of the portable measuring system of FIG. 1.

FIG. 1 shows a perspective view, illustrating portable measuring stick 102 of portable growth-measurement system 100, according to a preferred embodiment of the present invention. FIG. 2 shows a perspective view, illustrating the principal components of portable growth-measurement system 100 of FIG. 1. Preferred embodiments of portable growth-measurement system 100 preferably assist in measuring and recording the growth-activity of one or more children over successive intervals of time.

Preferably, portable measuring stick 102 comprises an elongated frame 103 having applied measurement markings (measurement indicia 104), as shown (at least embodying herein at least one measurement scale structured and arranged to assist accurate measurement of the growth-activity of the at least one child). Preferably, elongated frame 103 of portable measuring stick 102 comprises an overall length sufficient to record the growth of a typical child 101, essentially through the child's entire growth years. Most preferably, elongated frame 103 of portable measuring stick 102 comprises an overall length of about 7 feet, as shown. Preferably, the corresponding measurement indicia 104 extend substantially along the entire length of elongated frame 103, as shown. Preferably, measurement indicia 104 comprise a standard measurement scale, preferably utilizing standard units of measurement, such as, for example, preferably metric units or alternately preferably the U.S. units of feet and inches, as shown. Most preferably, indicia 104 comprise applied markings at one-inch intervals with applied numerals at each one-foot designation. Upon reading the teachings of this specification, those of ordinary skill in the art will now understand that, under appropriate circumstances, considering such issues as intended use, etc., other scale arrangements, such as producing a shorter scale, utilizing custom measurement indicia, providing finer scale markings, etc., may suffice.

Preferably, elongated frame 103 of portable measuring stick 102 further comprises non-measurement indicia 105 that may preferably be customized to the tastes of the user (such indicia may include depictions of stars, animals, butterflies, sports equipment, balloons, infant motifs, etc.). In a preferred method of the present invention, a customer may preferably custom select non-measurement indicia 105 to be applied to portable measuring stick 102. Upon reading the teachings of this specification, those of ordinary skill in the art will now understand that, under appropriate circumstances, considering such issues as intended use, etc., other indicia arrangements, such as establishing a means (e.g. a website) for customer ordering/specification of user-selected, factory-applied, "custom" indicia, providing a selection of non-measurement indicia to be applied after receipt of the device, etc., may suffice.

Preferably, the embodiments of the present invention can be disassembled into multiple segments allowing for convenient transport, such as, when traveling to visit a grandchild. Preferably, elongated frame 103 is separable into preferably at least three frame segments 106, as shown in FIG. 2. For clarity of description, the three frame segments 106 are identified herein as first measuring segment 106A, second measuring segment 106B, and third measuring segment 106C, as shown. Preferably, to assist compact storage, each frame segment 106 comprises an approximately equal overall length, as shown.

Preferably, frame segments 106 are assembled together like a puzzle, preferably utilizing a set of "jigsaw-puzzle-piece" interlocking connectors 108, as shown. This preferred segmented assembly arrangement of elongated frame 103 facilitates user packing and storage of the device during travel. Preferably, elongated frame 103 comprises two "jigsaw-puzzle-piece" interlocking connectors identified herein as first interlocking connector 108A and second interlocking connector 108B, as shown. Preferably, first interlocking connector 108A detachably interlocks first measuring segment 106A with second measuring segment 106B, as shown. Similarly, second interlocking connector 108B is preferably structured and arranged to detachably interlock third measuring segment 106C with second measuring segment 106B, as shown (at least embodying herein wherein such at least one first interlocker comprises at least one first "jigsaw-puzzle-piece" shape structured and arranged to provide detachable "jigsaw-puzzle-piece" interlocking of such at least one first measuring segment with such at least one second measuring segment; wherein such at least one second interlocker comprises at least one second "jigsaw-puzzle-piece" shape structured and arranged to provide detachable "jigsaw-puzzle-piece" interlocking of such at least one third measuring segment with such at least one second measuring segment). It is noted that, in the depiction of FIG. 2, frame segments 106 have been graphically cut to allow for the depiction of a greater illustrated level of detail. Also, it is noted that in the depiction of FIG. 2, first interlocking connector 108A is illustrated in a separated condition while second interlocking connector 108 is shown in an interlocked (connected) condition.

Figures 3, 4, 5:
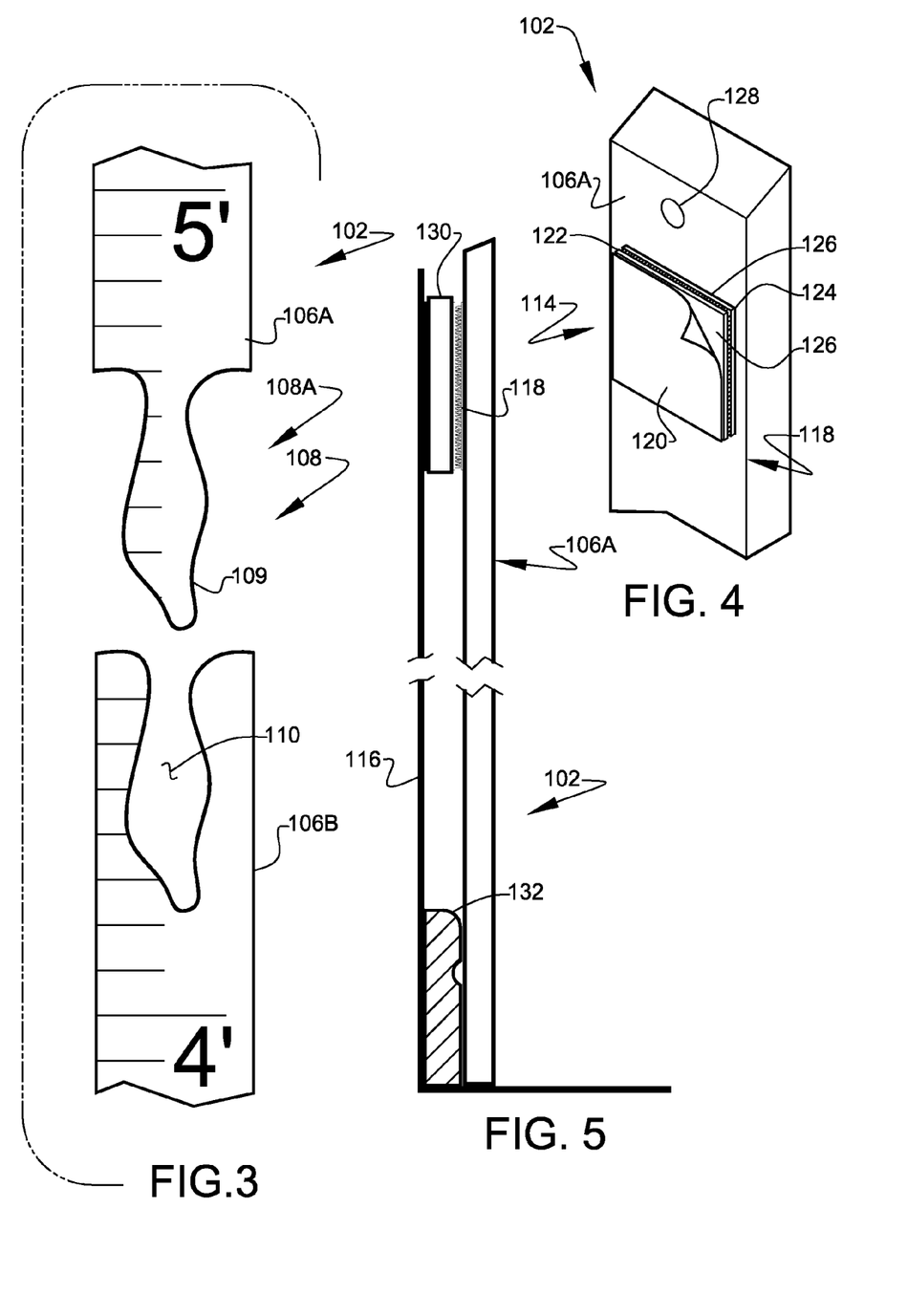
FIG. 3 shows an elevational view illustrating a preferred interlocking feature of the portable measuring stick of FIG. 1.
FIG. 4 shows a rear perspective view, of a removable wall attachment assembly structured and arranged to detachably mount the portable measuring stick to a vertical wall surface, according to the preferred embodiment of FIG. 1.
FIG. 5 shows a side view, in partial section, of a preferred mounting of the portable measuring stick of FIG. 1 to a vertical wall surface.

FIG. 3 shows a partial elevational view illustrating a single interlocking connector 108. Preferably, interlocking connectors 108 snuggly interlock to maximize rigidity and stability of the assembled elongated frame 103. Preferably, the interlocking geometrical shape of each interlocking connector is unique, e.g., to assist the user (especially a visually impaired or preschool user) in properly assembling the elongated frame 103, as described below. It is noted also that the unusual "jigsaw puzzle" locks may add to children's interest in the device.

Preferably, first interlocking connector 108A (depicted in FIG. 3) comprises at least one first male projection 109 providing a geometrically-shaped projection extending generally outwardly from one end (shown here as the lower end) of first measuring segment 106A, as shown in FIG. 2. Preferably, second measuring segment 106B comprises first female receiver 110 structured and arranged to receive first male projection 109, as shown. Preferably, first female receiver 110 comprises a geometrical shape complementary to first male projection 109, as shown.

Preferably, second interlocking connector 108B (see FIG. 2) comprises at least one second male projection 111 providing a geometrically-shaped projection extending generally outwardly from the lower end of second measuring segment 106B, as best shown in prior FIG. 2. Preferably, as discussed, the geometrical shape of second male projection 111 differs from that of first male projection 109, as shown.

Preferably, third measuring segment 106C comprises second female receiver 112 structured and arranged to receive second male projection 111, as shown in FIG. 2. Preferably, second female receiver 112 comprises a geometrical shape complementary to second male projection 111, as shown.

Preferably, portable measuring stick 102 is assembled by engagement of both first male projection 109 within first female receiver 110 and engagement of second male projection 111 within second female receiver 112, as shown in FIG. 1. Upon reading the teachings of this specification, those of ordinary skill in the art will now understand that, under appropriate circumstances, considering such issues as intended use, length preference, etc., other arrangements, such as utilizing only two segments, utilizing more than three segments, etc., may suffice.

Preferably, portable measuring stick 102 is constructed from at least one substantially rigid material, preferably a dimensionally stable material, most preferably a wood material, most preferably a natural wood material. Alternately preferably, portable measuring stick 102 is constructed from a synthetic material, preferably a plastic material. Upon reading the teachings of this specification, those of ordinary skill in the art will now understand that, under appropriate circumstances, considering such issues as intended use, cost, intended use, etc., other material selections, such as engineered wood materials, lightweight metals, rigid foams, composites of multiple materials, etc., may suffice.

Preferably, elongated frame 103 comprises a width W of between about 1½ inches and about 6 inches and a thickness T of between about ½ inch and about 1½ inch. Most preferably, elongated frame 103 comprises a width W of about 2½ inches and a thickness T of about ¾ inch, as illustrated in FIG. 2

Preferably, portable measuring stick 102 is adapted for removable mounting to a planar vertical surface. FIG. 4 shows a rear perspective view, of removable wall attachment assembly 114 assisting removable mounting of portable measuring stick 102 to a vertical wall surface, according to the preferred embodiment of FIG. 1. FIG. 5 shows a side view, in partial section, of a preferred mounting of portable measuring stick 102 to vertical wall surface 116. Preferably, the upper rear surface of first measuring segment 106A comprises removable wall attachment assembly 114, as shown (at least embodying herein at least one mount structured and arranged to mount such at least one measurement scale to at least one wall). Removable wall attachment assembly 114 preferably comprises a section of double-sided hook-and-loop tape 118, as shown. Preferably, hook-and-loop tape 118 comprises a two-part assembly having a hook-containing portion 122 and a loop-containing portion 124, as shown. Preferably, both hook-containing portion 122 and loop-containing portion 124 comprises an adhesive surface 126, as shown. Preferably, at least one of the two layers is pre-installed on the rear surface of first measuring segment 106A using its adhesive surface 126, as shown. Double-sided hook-and-loop tape preferred for use as hook-and-loop tape 118 include products produced under the Velcro® brand name.

To mount portable measuring stick 102 to vertical wall surface 116, a user preferably removes protective covering 120 from an adhesive surface 126 of double-sided hook-and-loop tape 118 and presses it firmly to wall surface 116. To remove portable measuring stick 102 from wall surface 116 after mounting (to allow the embodiment to be taken on a trip), the user simply separates hook-containing portion 122 from loop-containing portion 124.

The uppermost segment of elongated frame 103 preferably comprises aperture 128 to facilitate alternate preferred wall mounting using, as a preferred example, a nail driven into the wall surface. Upon reading the teachings of this specification, those of ordinary skill in the art will now understand that, under appropriate circumstances, considering such issues as intended use, user preference, etc., other temporary mounting arrangements, such as removable adhesives, freestanding base supports, etc., may suffice.

Some interior spaces in which portable measuring stick 102 is installed may have baseboards that prevent elongated frame 103 from being mounted vertically. Applying portable measuring stick 102 to such walls may result in an undesirable leaning of the stick after wall mounting. Preferably, the system further includes a set of compensating spacer blocks 130 structured and arranged to assist in plumb (vertical) mounting of portable measuring stick 102 to the vertical wall surface 116 (at least embodying herein at least one compensating spacer structured and arranged to compensatively space such at least one measurement scale at least one distance away from the at least one wall at least equal to the thickness of at least one baseboard of the at least one wall; wherein such at least one compensating spacer permits substantially vertical mounting of such at least one measurement scale adjacent the at least one wall comprising the at least one baseboard).

Spacer blocks 130 preferably comprise a set of rigid spacer segments that may be preferably placed between the vertical wall surface 116 and the hook-and-loop tape 118, as required. Preferably, spacer blocks 130 are supplied as three wood blocks of varying thickness (between about ½ inch and about ⅛ inch). One or more of the wood segments are preferably used to match the depth (thickness) of the lower baseboard 132, as shown. This preferred installation, using spacer blocks 130, assists in providing a frame of proper vertical orientation, as shown. Preferably, spacer blocks 130 are permanently or removeably adhered to wall surface 116. Alternately preferably, a portion of baseboard 132 can be removed to allow portable measuring stick 102 to fit snugly against wall surface 116.

Figure 6:
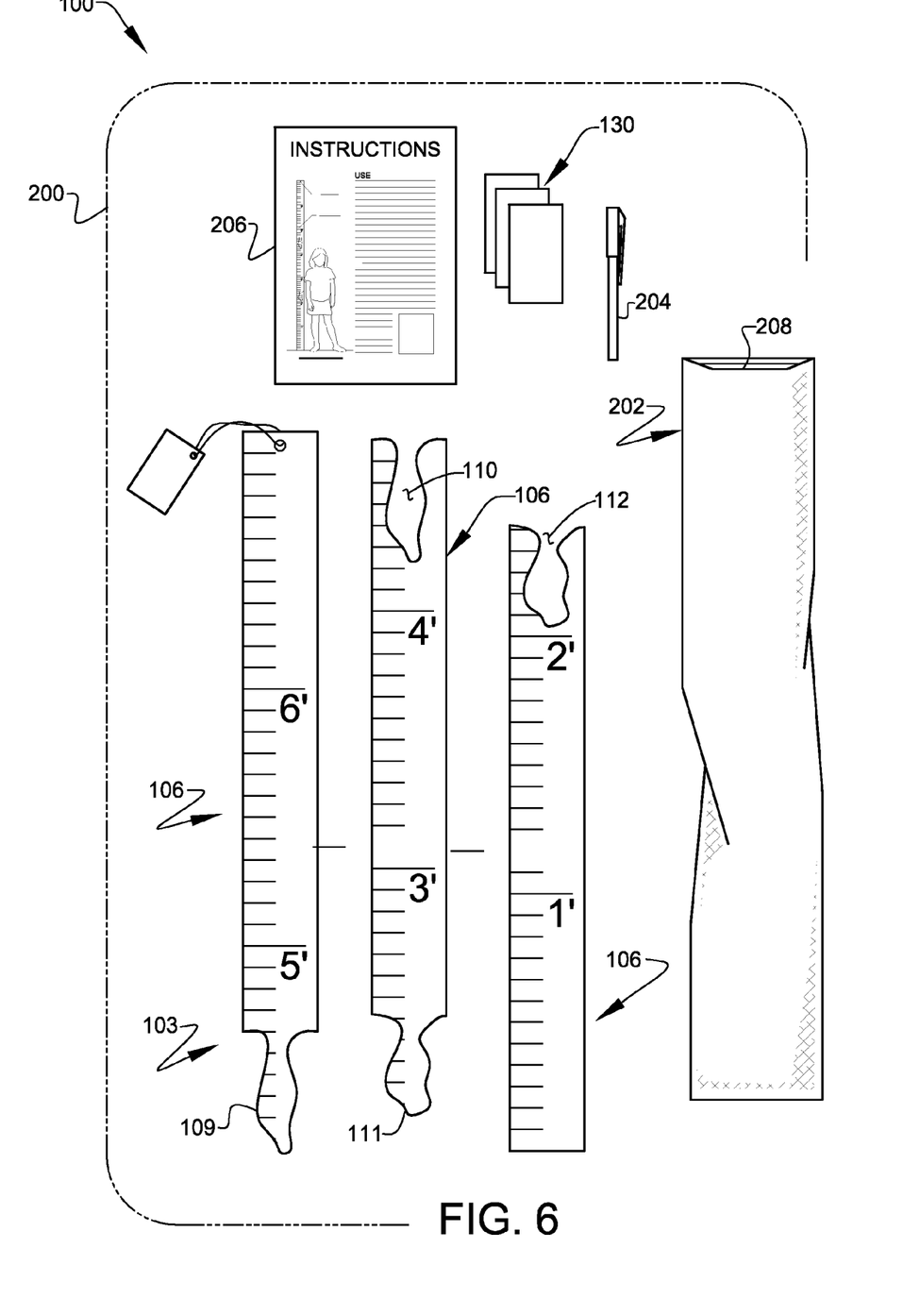
FIG. 6 shows an elevational view illustrating a preferred portable growth-measuring kit of the portable measuring stick system according to another preferred embodiment of the present invention.

FIG. 6 shows an elevational view, illustrating a preferred portable growth-measuring kit 200 of portable growth-measurement system 100, according to another preferred embodiment of the present invention. Preferably, portable growth-measuring kit 200 includes elongated frame 103 (including removable wall attachment assembly 114), storage bag 202, a set of three spacer blocks 130, marking pen 204, and a set of instructions of use 206, as shown. Upon reading the teachings of this specification, those of ordinary skill in the art will now understand that, under appropriate circumstances, considering such issues as intended use, cost, etc., other kit arrangements, such as the inclusion of multiple colored pens (to track individual children), alternate marking means such as insertable pegs, etc., may suffice.

Preferably, storage bag 202 comprises a cloth sleeve adapted to fully contain the three disassembled frame segments 106 of elongated frame 103 during transport (at least embodying herein at least one storage sleeve structured and arranged to storably sleeve such at least one measurement scale during transport). The disassembled frame segments 106 are preferably designed to fit in most large suitcases. Preferably, storage bag 202 comprises at least one closure, preferably hook-and-loop closure 208, as shown.

Preferably, marking pen 204 allows users to mark the height, age, and name of the child on the front surface of elongated frame 103. Preferably, marking pen 204 is of an indelible-ink type to facilitate durability of the user-applied markings. Upon reading the teachings of this specification, those of ordinary skill in the art will now understand that, under appropriate circumstances, considering such issues as intended use, cost, etc., other kit components, such as user appliable non-measurement indicia, etc., may suffice.

Figure 7:
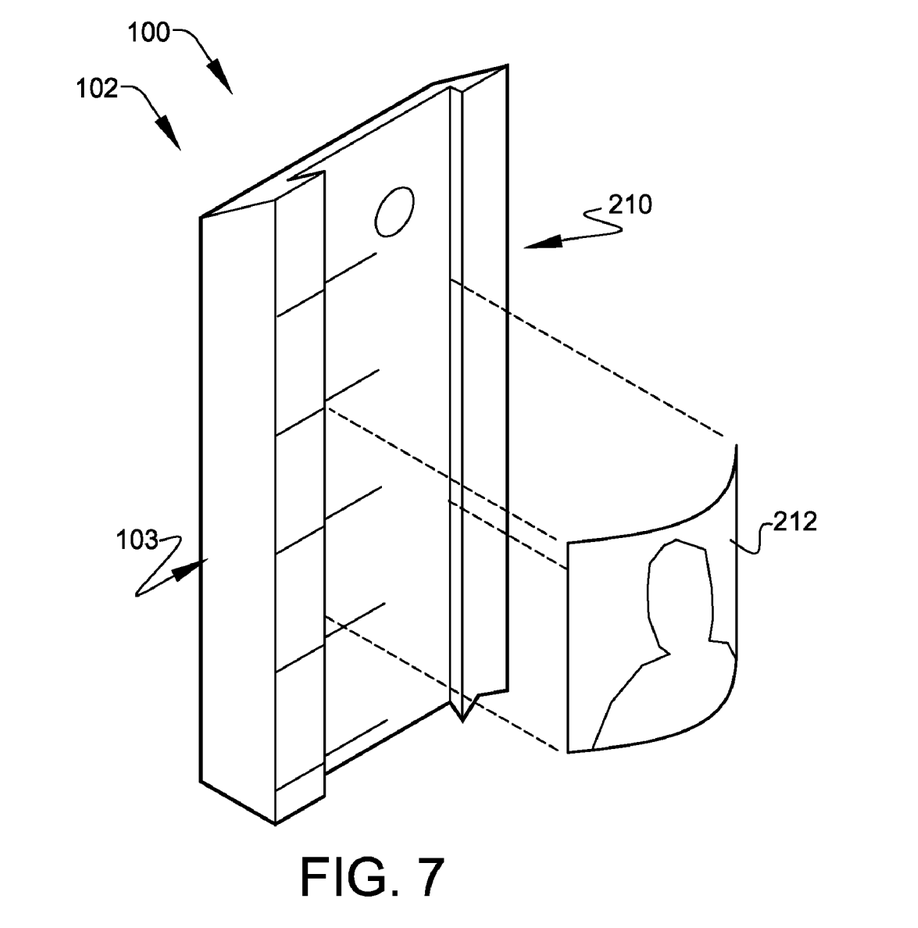
FIG. 7 shows a perspective view of a photograph-receiving slot, extending along the length of the portable measuring stick, according to an alternate preferred embodiment of the present invention.
Figure 8:
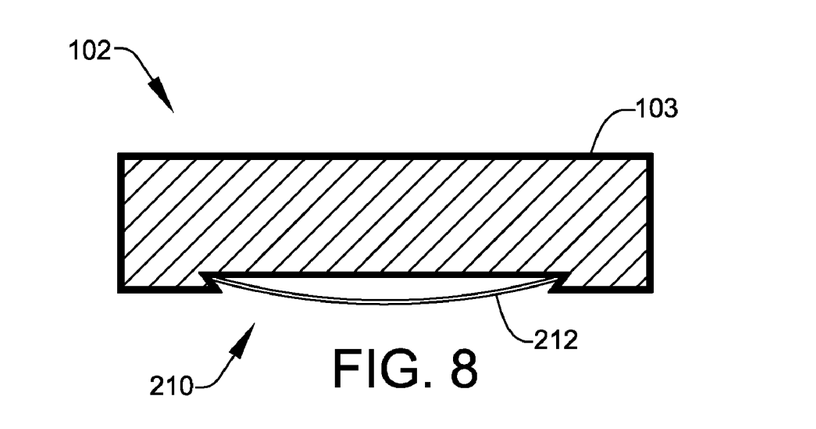
FIG. 8 shows a sectional view, through the section 8-8 of FIG. 7, illustrating a preferred engagement of a photograph within the photograph-receiving slot illustrated in FIG. 7.

FIG. 7 shows a perspective view of a photograph-receiving slot 210, preferably extending along the length of elongated frame 103, according to an alternate preferred embodiment of the present invention. FIG. 8 shows a sectional view through the section 8-8 of FIG. 7, illustrating a preferred engagement of photograph 212 within photograph-receiving slot 210. Photograph-receiving slot 210 provides a preferred enhancement to the basic portable measuring stick 102. Preferably, photograph-receiving slot 210 allows a photograph or similar planar object to be fixed at point along the length of portable measuring stick 102 (at least embodying herein at least one slot structured and arranged to hold at least one substantially planar object). For example, a grandparent may place a photograph of a grandchild near a height marking as a means to remember the child's appearance at the time mark was made.

Preferably, photograph-receiving slot 210 is formed by routing a wide dovetail-shaped slot along the front face of elongated frame 103, as shown. Upon reading the teachings of this specification, those of ordinary skill in the art will now understand that, under appropriate circumstances, considering such issues as intended use, etc., other photo attachments, such as clips, applied rails, etc., may suffice.

Figure 9:
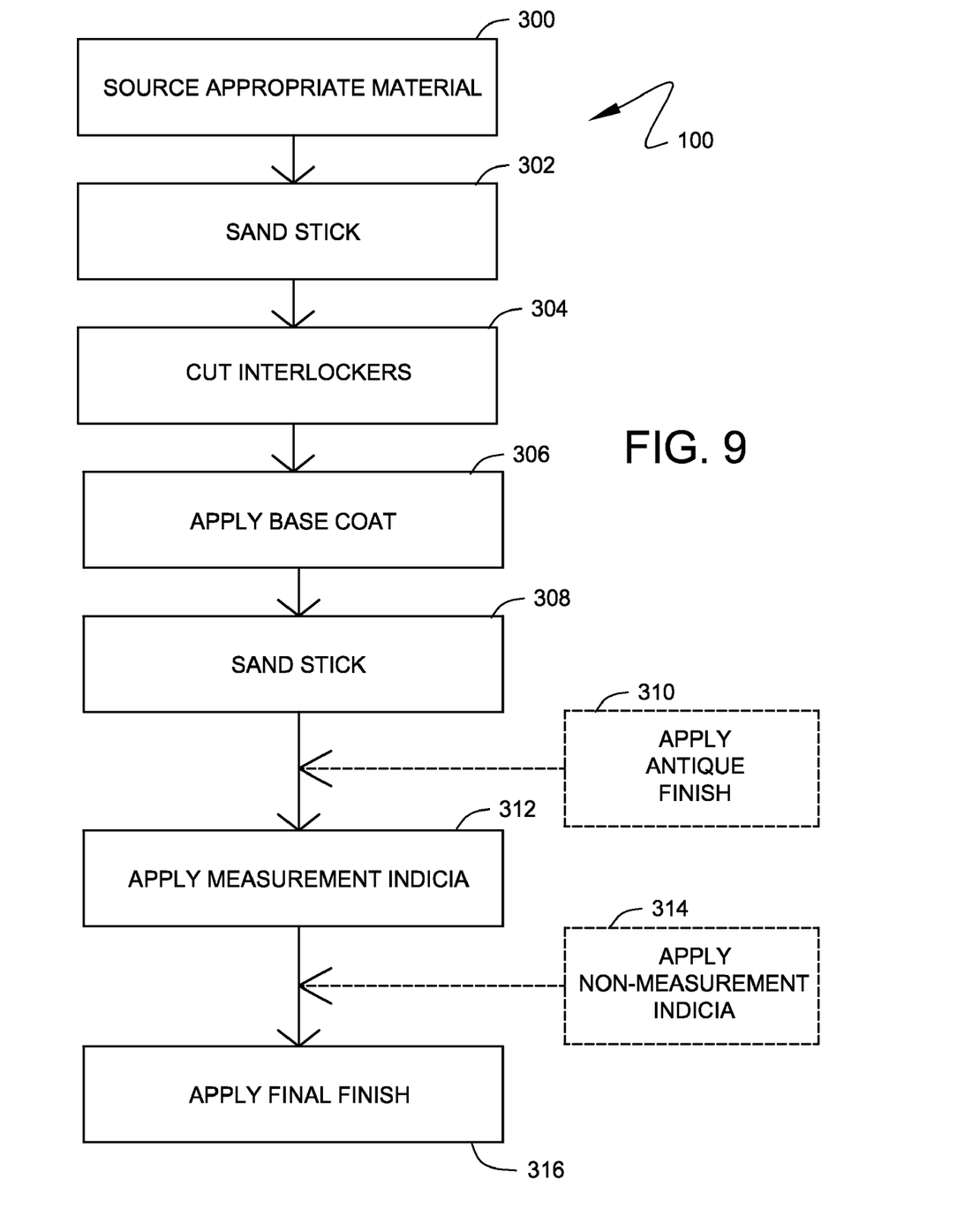
FIG. 9 shows a flowchart schematically illustrating a preferred series of fabrication steps according to a preferred method of producing preferred embodiments of the present invention.

FIG. 9 shows a flowchart schematically illustrating a preferred series of fabrication steps according to a preferred method of producing preferred embodiments of the present invention. Preferred embodiments of portable measuring stick 102 are preferably intended to be a unique "heirloom" item that a family uses as a remembrance to pass on to subsequent generations. In keeping with this preferred heirloom concept, each portable measuring stick 102 is intended to comprise a level of uniqueness metaphorically expressing the individuality of each family. Thus, preferred embodiments of portable measuring stick 102 are preferably substantially handcrafted. This handcrafted uniqueness is specifically expressed in hand painted finishes and artisan-applied application of measurement indicia 104. Furthermore it is preferred that each "jigsaw-puzzle-piece" interlocking connector 108 of the elongated frame 103 is produced by hand forming on a scroll-type saw to produce essentially unique "jigsaw puzzle-like" connectors within each individual portable measuring stick 102 (at least embodying herein wherein such at least one first interlocker and such at least one second interlocker comprise a geometrical shape at least partially unique from any other one of such at least one first interlocker and such at least one second interlocker; and at least embodying herein wherein such at least one first "jigsaw-puzzle-piece" shape differs from such at least one second "jigsaw-puzzle-piece" shape).

In a preferred method of constructing a portable measuring stick 102, an artisan sources a bar (stick) of appropriate length width, thickness, and material composition, as indicated preferred step 300 of FIG. 9. In the subsequent preferred step 302, the artisan preferably sands each stick to provide a suitable base surface for the application of a finish. Next, the artisan cuts each bar, with a unique "jigsaw-puzzle-piece" cut to produce the puzzle-like interlocking connectors 108, as indicated in preferred step 304. Preferably, the artisan applies to the base surface, a base coat of finish, preferably a paint material, as indicated in preferred step 306. The artisan then preferably sands the surface of the stick preferably using a fine sanding material, most preferably steel wool, as indicated in preferred step 308. In optional preferred step 310, the artisan applies an antique finish, preferably comprising a translucent paint-based wash. Upon reading the teachings of this specification, those of ordinary skill in the art will now understand that, under appropriate circumstances, considering such issues as intended use, intended market, etc., other finish arrangements, such as high-gloss finishes, decoupage finishes, faux-finishes, stain finishes, etc., may suffice. Furthermore, upon reading the teachings of this specification, those of ordinary skill in the art will now understand that, under appropriate circumstances, considering such issues as customer preference, cost, etc., other finish arrangements, such as supplying unfinished/user completed embodiments, etc., may suffice.

Preferably, measurement indicia 104 are then applied, as indicated in preferred step 312. To apply measurement indicia 104, preferably, the artisan first marks the locations of the measurement units using a measurement guide, such as a ruler, or tape measure. The artisan then hand applies the final measurement indicia 104 using a contrasting painted finish.

In optional preferred step 314, the artisan applies non-measurement indicia 105. Preferably non-measurement indicia 105 comprise an adhesive-applied pre-printed sticker. Upon reading the teachings of this specification, those of ordinary skill in the art will now understand that, under appropriate circumstances, considering such issues as intended use, cost, etc., other arrangements, such as hand-painted graphics, carvings, dimensional objects applied by nail or screw, etc., may suffice. In subsequent preferred step 316, the artisan applies a final protective varnish finish.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A portable measuring system, relating to measuring growth-activity of at least one child over successive intervals of time, said system comprising:
    a) at least one measurement scale structured and arranged to assist accurate measurement of growth-activity of at least one child;
    b) wherein said at least one measurement scale comprises
        i) at least one first measuring segment structured and arranged to provide at least one first segment portion of said at least one measurement scale,
        ii) at least one second measuring segment structured and arranged to provide at least one second segment portion of said at least one measurement scale,
        iii) at least one third measuring segment structured and arranged to provide at least one third segment portion of said at least one measurement scale,
        iv) at least one first interlocker structured and arranged to detachably interlock said at least one first measuring segment with said at least one second measuring segment, and
        v) at least one second interlocker structured and arranged to detachably interlock said at least one third measuring segment with said at least one second measuring segment;
    c) wherein said at least one first interlocker comprises at least one first "jigsaw-puzzle-piece" shape structured and arranged to provide detachable "jigsaw-puzzlepiece" interlocking of said at least one first measuring segment with said at least one second measuring segment;

d) wherein said at least one second interlocker comprises at least one second "jigsaw-puzzle-piece" shape structured and arranged to provide detachable "jigsaw-puzzle-piece" interlocking of said at least one third measuring segment with said at least one second measuring segment;

e) wherein said at least one first "jigsaw-puzzle-piece" shape differs from said at least one second "jigsaw-puzzle-piece" shape; and f) wherein detachable "jigsaw-puzzle-piece" interlocking of said at least one first measuring segment with said at least one second measuring segment and detachable "jigsaw-puzzle-piece" interlocking of said at least one third measuring segment with said at least one second measuring segment enables the use of said at least one measurement scale to assist accurate measurement of growth-activity of at least one child;

g) wherein said at least one first interlocker is further characterized in that said at least one first interlocker comprises
  i) at least one first male projection structured and arranged to provide at least one first geometrically-shaped male projection extending generally outwardly from said at least one first measuring segment, and
  ii) fashioned within said at least one second measuring segment, at least one first female receiver structured and arranged to receive said at least one first male projection;

h) wherein said at least one second interlocker is further characterized in that said at least one second interlocker further comprises
  i) at least one second male projection structured and arranged to provide at least one second geometrically-shaped male projection extending outwardly from said at least one second measuring segment, and
  ii) fashioned within said at least one third measuring segment, at least one second female receiver structured and arranged to receive said at least one second male projection;

i) wherein said at least one first female receiver comprises at least one first geometrical shape substantially complementary to the at least one first geometrically-shaped male projection of said at least one first male projection;

j) wherein said at least one second female receiver comprises at least one second geometrical shape substantially complementary to the at least one second geometrically-shaped male projection of said at least one second male projection; and k) wherein said at least one first geometrical shape differs from said at least one second geometrical shape.

2. The portable measuring system according to claim 1 further comprising at least one mount structured and arranged to mount said at least one measurement scale to at least one wall.

3. The portable measuring system according to claim 2 wherein:

a) said at least one mount comprises at least one compensating spacer structured and arranged to compensatively space said at least one measurement scale at least one distance away from the at least one wall at least equal to the thickness of at least one baseboard of the at least one wall;

b) wherein said at least one compensating spacer allows substantially vertical mounting of said at least one measurement scale adjacent the at least one wall comprising the at least one baseboard.

4. The portable measuring system according to claim 1 further comprising at least one storage sleeve structured and arranged to storably sleeve said at least one measurement scale during transport.

5. The portable measuring system according to claim 1 further comprising:

a) at least one slot structured and arranged to hold at least one substantially planar object;

b) wherein said at least one slot extends along at least one length of said at least one measurement scale.

6. The portable measuring system according to claim 5 wherein said at least one slot comprises at least one dovetail shape.

7. The portable measuring system according to claim 1 wherein:

a) said at least one first measuring segment, said at least one second measuring segment, and said at least one third measuring segment each comprise a width of between about 1½ inches and about 6 inches; and b) said at least one first measuring segment, said at least one second measuring segment, and said at least one third measuring segment each comprise a thickness of between about ½ inch and about 1½ inch.

8. The portable measuring system according to claim 1 wherein said at least one first interlocker and said at least one second interlocker comprise a geometrical shape at least partially unique from any other one of said at least one first interlocker and said at least one second interlocker.

9. The portable measuring system according to claim 1 wherein each measuring segment comprises measurement indicia.

10. The portable measuring system according to claim 1 wherein said at least one measurement scale further comprises at least one slot structured and arranged to hold at least one substantially planar object.

11. The portable measuring system according to claim 1 wherein a photograph may be attached to at least one of said at least one first measuring segment, said at least one second measuring segment, and said at least one third measuring segment.

12. A portable measuring system kit, relating to measuring growth-activity of at least one minor over successive intervals of time, comprising:

a) at least one measurement scale structured and arranged to assist accurate measurement of growth-activity of at least one minor, wherein said at least one measurement scale comprises
  i) at least one first measuring segment structured and arranged to provide at least one first segment portion of said at least one measurement scale,
  ii) at least one second measuring segment structured and arranged to provide at least one second segment portion of said at least one measurement scale,
  iii) at least one third measuring segment structured and arranged to provide at least one third segment portion of said at least one measurement scale,
  iv) at least one first interlocker structured and arranged to detachably interlock said at least one first measuring segment with said at least one second measuring segment, and v) at least one second interlocker structured and arranged to detachably interlock said at least one third measuring segment with said at least one second measuring segment, vi) wherein said at least one first interlocker comprises at least one first "jigsaw-puzzle-piece" shape structured and arranged to provide detachable "jigsaw-puzzle-piece" interlocking of said at least one first measuring segment with said at least one second measuring segment, vii) wherein said at least one second interlocker comprises at least one second "jigsaw-puzzle-piece" shape structured and arranged to provide detachable "jigsaw-puzzle-piece" interlocking of said at least one third measuring segment with said at least one second measuring segment, viii) wherein said at least one first "jigsaw-puzzle-piece" shape differs from said at least one second "jigsaw-puzzle-piece" shape, and ix) wherein detachable "jigsaw-puzzle-piece" interlocking of said at least one first measuring segment with said at least one second measuring segment and detachable "jigsaw-puzzle-piece" interlocking of said at least one third measuring segment with said at least one second measuring segment enables the use of said at least one measurement scale to assist accurate measurement of growth-activity of at least one minor, x) wherein said at least one first interlocker is further characterized in that said at least one first interlocker comprises
  i) at least one first male projection structured and arranged to provide at least one first geometrically-shaped male projection extending generally outwardly from said at least one first measuring segment, and
  ii) fashioned within said at least one second measuring segment, at least one first female receiver structured and arranged to receive said at least one first male projection, xi) wherein said at least one second interlocker is further characterized in that said at least one second interlocker comprises
  i) at least one second male projection structured and arranged to provide at least one second geometrically-shaped male projection extending outwardly from said at least one second measuring segment, and
  ii) fashioned within said at least one third measuring segment, at least one second female receiver structured and arranged to receive said at least one second male projection, xii) wherein said at least one first female receiver comprises at least one first geometrical shape substantially complementary to the at least one first geometrically-shaped male projection of said at least one first male projection, xiii) wherein said at least one second female receiver comprises at least one second geometrical shape substantially complementary to the at least one second geometrically-shaped male projection of said at least one second male projection, and xiv) wherein said at least one first geometrical shape differs from said at least one second geometrical shape; and b) at least one storage bag structured and arranged to carry the measuring segments when the measuring segments are not interlocked.

13. The portable measuring system kit according to claim 12 further comprising at least one set of user instructions to provide instruction for use.

14. The portable measuring system kit according to claim 12 further comprising at least one marking pen to assist at least one user in applying visual markings to at least one of the measuring segments.

15. The portable measuring system kit according to claim 12 further comprising at least one compensating spacer structured and arranged to compensatively space said at least one measurement scale at least one distance away from at least one wall at least equal to the thickness of at least one baseboard of at least one wall.

16. The portable measuring system kit according to claim 15 comprising at least two compensating spacers sized differently to accommodate different thickness of baseboards.

17. The portable measuring system according to claim 12 wherein each measuring segment comprises measurement indicia.

18. A portable measuring system, relating to measuring growth-activity of a subject over successive intervals of time, said system comprising:
  a) a measurement scale structured and arranged to assist accurate measurement of the growth-activity of a subject;
  b) wherein said measurement scale comprises
    i) a first measuring segment structured and arranged to provide a first segment portion of said measurement scale,
    ii) a second measuring segment structured and arranged to provide a second segment portion of said measurement scale,
    iii) a third measuring segment structured and arranged to provide a third segment portion of said measurement scale,
    iv) a first interlocker structured and arranged to detachably interlock said first measuring segment with said second measuring segment, and
    v) a second interlocker structured and arranged to detachably interlock said third measuring segment with said second measuring segment,
    vi) wherein said first interlocker comprises a first "jigsaw-puzzle-piece" shape structured and arranged to provide detachable "jigsaw-puzzle-piece" interlocking of said first measuring segment with said second measuring segment,
    vii) wherein said second interlocker comprises a second "jigsaw-puzzle-piece" shape structured and arranged to provide detachable "jigsaw-puzzle-piece" interlocking of said third measuring segment with said second measuring segment,
    viii) wherein said first "jigsaw-puzzle-piece" shape differs from said second "jigsaw-puzzle-piece" shape,
    ix) wherein said first interlocker is further characterized in that said first interlocker comprises
      (1) a first male projection structured and arranged to provide a first geometrically-shaped male projection extending generally outwardly from said first measuring segment, and
      (2) fashioned within said second measuring segment, a first female receiver structured and arranged to receive said first male projection,
    x) wherein said second interlocker is further characterized in that said second interlocker comprises (1) a second male projection structured and arranged to provide a second geometrically-shaped male projection extending outwardly from said at least one second measuring segment, and (2) fashioned within said at least one third measuring segment, at least one second female receiver structured and arranged to receive said at least one second male projection, xi) wherein said first female receiver comprises a first geometrical shape substantially complementary to the first geometrically-shaped male projection of said at least one first male projection, xii) wherein said second female receiver comprises a second geometrical shape substantially complementary to the second geometrically-shaped male projection of said second male projection, and xiii) wherein said first geometrical shape differs from said second geometrical shape.

19. The portable measuring system according to claim 18 wherein each measuring segment comprises measurement indicia.

20. The portable measuring system according to claim 18 wherein at least one of said first measuring segment, second measuring segment, and third measuring segment comprises non-measurement indicia.

21. The portable measuring system according to claim 18 wherein a photograph may be attached to said measurement scale.

22. The portable measuring system according to claim 18 wherein a photograph may be attached to at least one of said first measuring segment, said second measuring segment, and said third measuring segment.

23. The portable measuring system according to claim 18 wherein said measurement scale further comprises at least one slot structured and arranged to hold a photograph.

24. The portable measuring system according to claim 18 wherein at least one said first measuring segment, said second measuring segment, and said third measuring segment comprises at least one slot structured and arranged to hold a substantially planar object.

25. The portable measuring system according to claim 18 further comprising a wall attachment assembly structured and arranged to mount said measurement scale to a wall.

\* \* \* \* \*